(12) United States Patent
Sadler et al.

(10) Patent No.: US 9,669,350 B2
(45) Date of Patent: Jun. 6, 2017

(54) PROCESS FOR ADSORBING HYDROGEN CHLORIDE FROM A REGENERATION VENT GAS

(71) Applicant: UOP LLC, Des Plaines, IL (US)

(72) Inventors: Clayton C. Sadler, Arlington Heights, IL (US); David A. Wegerer, Lisle, IL (US); Elizabeth Carter, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 349 days.

(21) Appl. No.: 14/575,467

(22) Filed: Dec. 18, 2014

(65) Prior Publication Data

US 2016/0175758 A1    Jun. 23, 2016

(51) Int. Cl.
*B01D 53/08*       (2006.01)

(52) U.S. Cl.
CPC ........ *B01D 53/08* (2013.01); *B01D 2253/104* (2013.01); *B01D 2257/2025* (2013.01); *B01D 2257/2045* (2013.01); *B01D 2259/40001* (2013.01); *B01D 2259/4009* (2013.01)

(58) Field of Classification Search
CPC ...... B01D 2253/104; B01D 2257/2025; B01D 2257/2045; B01D 2259/40001; B01D 2259/4009; B01D 53/08
See application file for complete search history.

(56) References Cited

U.S. PATENT DOCUMENTS

| | | | |
|---|---|---|---|
| 2,642,955 A * | 6/1953 | Huntington | B01D 53/08 95/105 |
| 5,336,834 A | 8/1994 | Zarchy et al. | |
| 5,705,730 A | 1/1998 | Zarchy et al. | |
| 5,837,636 A | 11/1998 | Sechrist et al. | |
| 5,891,323 A * | 4/1999 | Willis | B01D 53/04 208/211 |
| 5,965,473 A | 10/1999 | Sechrist et al. | |
| 6,117,809 A | 9/2000 | Sechrist et al. | |
| 6,123,833 A | 9/2000 | Sechrist et al. | |
| 6,290,916 B1 | 9/2001 | Sechrist et al. | |
| 6,461,992 B1 | 10/2002 | Sechrist et al. | |
| 6,784,132 B1 | 8/2004 | Sechrist | |
| 6,790,802 B1 | 9/2004 | Sechrist | |
| 6,881,391 B1 | 4/2005 | Sechrist | |
| 7,223,710 B1 | 5/2007 | Sechrist | |
| 7,981,272 B2 | 7/2011 | Dziabis et al. | |
| 8,071,497 B2 | 12/2011 | Yuan et al. | |
| 2008/0156699 A1* | 7/2008 | Yuan | B01D 53/04 208/139 |
| 2011/0083936 A1 | 4/2011 | Yuan et al. | |

* cited by examiner

*Primary Examiner* — Christopher P Jones

(57) ABSTRACT

A process for adsorbing hydrogen chloride (HCl) from a regeneration vent gas. The regeneration vent gas is cooled from a catalyst regeneration zone. The cooled regeneration vent gas is passed to an adsorption zone that is spaced apart from the catalyst regeneration zone. HCl from the regeneration vent gas is adsorbed onto a sorbent in the adsorption zone to enrich the sorbent with HCl to provide HCl-rich sorbent and deplete HCl from the regeneration vent gas to provide HCl-lean regeneration vent gas. HCl-lean regeneration vent gas is purged as an effluent gas. HCl-rich sorbent is passed from the adsorption zone to a sorbent regeneration zone. HCl from the HCl-rich sorbent in the sorbent regeneration zone is desorbed to provide a regenerated sorbent. The regenerated sorbent is transferred to the adsorption zone.

12 Claims, 1 Drawing Sheet

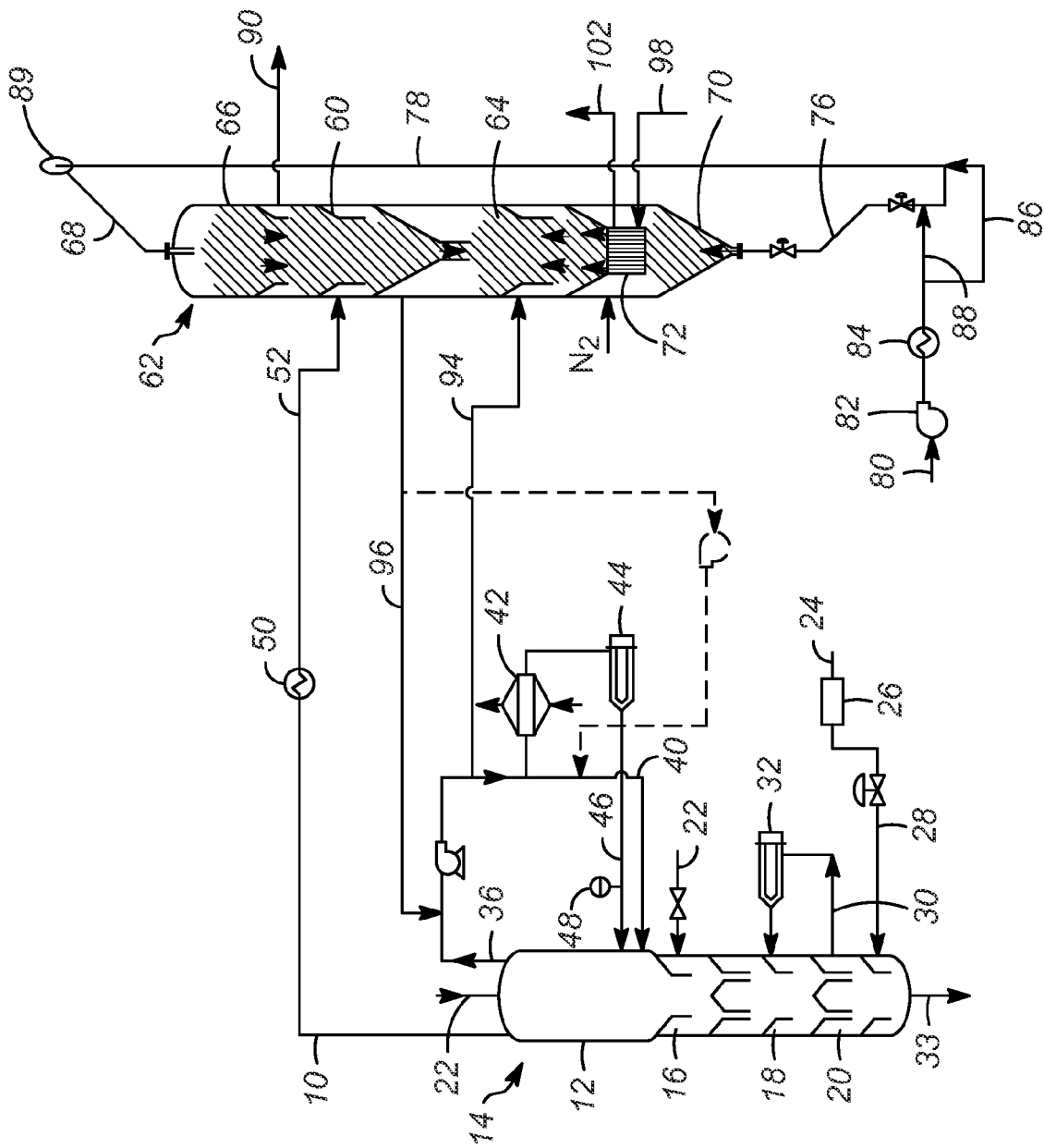

PROCESS FOR ADSORBING HYDROGEN CHLORIDE FROM A REGENERATION VENT GAS

FIELD OF THE INVENTION

This invention relates generally to processes for adsorbing hydrogen chloride from a regeneration vent gas.

BACKGROUND OF THE INVENTION

Numerous hydrocarbon conversion processes are widely used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others.

Many such processes use catalysts to promote hydrocarbon conversion reactions. These catalysts tend to deactivate for a variety of reasons, including the deposition of carbonaceous material or coke upon the catalyst, sintering or agglomeration or poisoning of catalytic metals on the catalyst, and/or loss of catalytic metal promoters such as halogens. Consequently, these catalysts are typically reactivated in a process called regeneration.

Reactivation can include, for example, removing coke from the catalyst by burning, redispersing catalytic metals such as platinum on the catalyst, oxidizing such catalytic metals, reducing such catalytic metals, replenishing catalytic promoters such as chloride on the catalyst, and drying the catalyst. For example, U.S. Pat. No. 6,153,091 discloses a method for regenerating spent catalyst.

In a some regeneration processes, a catalyst is passed from a hydrocarbon reaction zone (reaction zone) to a catalyst regeneration zone which may include a burn zone, a chlorination zone, a catalyst drying zone, and a catalyst cooling zone. The catalyst includes coke, which is burned off from the catalyst in the burn zone. A chloride, which is a catalytic promoter, is replaced on the catalyst in the chlorination zone. The catalyst is dried in the catalyst drying zone, and cooled in the catalyst cooling zone, and then returned to the reaction zone.

In the chlorination zone, a chlorine-containing species (chloro-species) typically is introduced to contact the catalyst and replenish the chloride. The chloro-species may be chemically or physically sorbed onto the catalyst as chloride or may remain dispersed in a stream that contacts the catalyst. However, the introduced chloro-species causes a flue gas stream vented from the regeneration zone, referred to herein as regeneration vent gas, to contain hydrogen chloride (HCl). Emissions of HCl in the regeneration vent gas pose environmental concerns if the regeneration vent gas is purged to atmosphere.

Vapor phase adsorbent processes for removing HCl, such as those described in U.S. Pat. No. 5,837,636, significantly reduce regeneration vent gas HCl emissions without the need for caustic scrubbing. An example HCl adsorption process cools the regeneration vent gas. The cooled regeneration vent gas is contacted with spent catalyst in an adsorption zone where HCl is adsorbed onto the catalyst. The vent gas product from the adsorption zone is depleted in HCl and vented to atmosphere or routed to further downstream processing.

This adsorption zone is conventionally integrated into an existing regeneration zone by retrofitting the adsorption zone into a disengaging hopper through which spent catalyst is introduced into the regeneration zone (typically a vessel). However, such retrofitting in certain cases can be difficult to implement to optimize the performance, operability, and/or maintainability of the adsorption process. Further, retrofitting typically requires significant modification or replacement of the disengaging hopper, which is performed during a unit shutdown, increasing costs.

Therefore, there remains a need for effective and efficient processes for adsorbing HCl from a regeneration vent gas.

SUMMARY OF THE INVENTION

The present invention is directed to providing effective and efficient processes for adsorbing chloride from a regeneration vent gas.

Accordingly, in one aspect of the present invention, the present invention provides a process for adsorbing hydrogen chloride (HCl) from a regeneration vent gas. The regeneration vent gas is cooled from a catalyst regeneration zone. The cooled regeneration vent gas is passed to an adsorption zone that is spaced apart from the catalyst regeneration zone. HCl from the regeneration vent gas is adsorbed onto a sorbent in the adsorption zone to enrich the sorbent with HCl to provide HCl-rich sorbent and deplete HCl from the regeneration vent gas to provide HCl-lean regeneration vent gas. The HCl-lean regeneration vent gas is purged as an effluent gas. The HCl-rich sorbent is passed from the adsorption zone to a sorbent regeneration zone. HCl from the HCl-rich sorbent is desorbed in the sorbent regeneration zone to provide a regenerated sorbent. The regenerated sorbent is transferred to the adsorption zone.

In an aspect of some embodiments, the catalyst regeneration zone is disposed within a vessel, and the adsorption zone and the sorbent regeneration zone are disposed within one or more additional vessels that are spaced apart from the vessel of the catalyst regeneration zone.

In an aspect of some embodiments, the catalyst regeneration zone comprises a burn zone, and the regeneration vent gas is purged from the burn zone.

In an aspect of some embodiments, said desorbing occurs at a desorbing temperature, and the process further comprises passing a burn zone vent gas at the desorbing temperature from the burn zone to the sorbent regeneration zone.

In an aspect of some embodiments, the process further comprises passing a regeneration vent gas from the sorbent regeneration zone to the catalyst regeneration zone.

In an aspect of some embodiments, the process further comprises cooling the regenerated sorbent in a cooling zone disposed below the sorbent regeneration zone, and collecting the regenerating sorbent in a collecting zone disposed below the cooling zone.

In an aspect of some embodiments, the process further comprises measuring a change in the cooling zone, and measuring a thermal mass flow using the measured temperature change.

In an aspect of some embodiments, said transferring comprises transferring the collected sorbent from the sorbent collection zone to a sorbent loading zone disposed above the adsorption zone using a carrier gas, and recycling the carrier gas.

In an aspect of some embodiments, the regeneration vent gas is from a catalyst regeneration zone having a catalyst circulating between a hydrocarbon process reaction zone and the catalyst regeneration zone, and the sorbent circulates between the adsorption zone and the sorbent regeneration zone independently of the circulation of the catalyst through the catalyst regeneration zone.

Another aspect of the invention provides a process for adsorbing hydrogen chloride (HCl) from a regeneration vent gas vented from a catalyst regeneration zone. The regeneration vent gas from a regeneration zone is cooled to an adsorbing temperature. The cooled regeneration vent gas is passed to an adsorption zone within an adsorption vessel that is spaced apart from the regeneration zone. HCl from the regeneration vent gas is adsorbed onto a sorbent in the adsorption zone at the adsorbing temperature to enrich the sorbent with HCl to provide an HCl-rich sorbent and deplete HCl from the regeneration vent gas to provide an HCl-lean regeneration vent gas. HCl from the HCl-rich sorbent is desorbed in a sorbent regeneration zone disposed below the adsorption zone to provide a regenerated sorbent. A lift gas is introduced to the adsorption vessel. A vent gas is passed from the sorbent regeneration zone to the catalyst regeneration zone, wherein the vent gas includes a portion of the lift gas. The chloride-lean regeneration vent gas and another portion of the lift gas is purged as an effluent gas, and the regenerated sorbent is circulated to the adsorption zone.

In an aspect of some embodiments, said circulating comprises transporting sorbent using a carrier gas.

In an aspect of some embodiments, the process further comprises passing a vent gas from a burn zone of the catalyst regeneration zone to the sorbent regeneration zone.

In an aspect of some embodiments, the process further comprises returning a vent gas from the sorbent regeneration zone to the catalyst regeneration zone.

In an aspect of some embodiments, the process further comprises controlling a flow of the circulating sorbent to the adsorption zone.

In an aspect of some embodiments, said controlling comprises collecting the regenerated sorbent in a collection zone disposed below the sorbent regeneration zone, and controlling a flow of the regenerated sorbent from an output of the collection zone.

In an aspect of some embodiments, a pressure of the burn zone is greater than a pressure of the sorbent regeneration zone.

In an aspect of some embodiments, the process further comprises cooling the sorbent from the sorbent regeneration zone in a cooling zone with a suitable heat sink. An example heat sink is air.

In an aspect of some embodiments, gas flow in the adsorption zone and the sorbent regeneration zone is co-current or counter-current with respect to the sorbent flow.

In an aspect of some embodiments, gas flows radially in the adsorption zone and the sorbent regeneration zone.

Another aspect of the invention provides a process for adsorbing hydrogen chloride (HCl) from a regeneration vent gas vented from a catalyst regeneration zone. The regeneration vent gas from a burn zone in the regeneration zone is cooled to an adsorbing temperature. The cooled regeneration vent gas is passed to an adsorption zone within an adsorption vessel that is spaced apart from the regeneration zone. A lift gas, for example, containing nitrogen is introduced to the adsorption vessel. HCl from the regeneration vent gas is adsorbed onto a sorbent in the adsorption zone, said adsorbing enriching the sorbent with HCl to provide an HCl-rich sorbent and depleting HCl from the regeneration vent gas to provide an HCl-lean regeneration vent gas. The HCl-rich sorbent is passed by gravity from the adsorption zone to a sorbent regeneration zone. A burn zone vent gas is passed from the burn zone to the sorbent regeneration zone. HCl is desorbed from the HCl-rich sorbent in the sorbent regeneration zone to provide a regenerated sorbent and a sorbent regeneration vent gas. The regenerated sorbent is cooled in a cooling zone. The sorbent regeneration vent gas is passed to the catalyst regeneration zone. The cooled sorbent is collected in a sorbent collection zone. The HCl-lean regeneration vent gas and a portion of the lift gas are purged to atmosphere. The collected sorbent is transferred from the sorbent collection zone to the adsorption zone along with a portion of the lift gas. The sorbent circulates between the adsorption zone, the sorbent regeneration zone, the cooling zone, and the collection zone independently of a circulation of the catalyst between the catalyst regeneration zone and a hydrocarbon process reaction zone.

A process including at least one of the above aspects is beneficial and desirable for the reasons described herein.

In yet another aspect of the present invention, a process includes at least two, at least three, or all of the above described aspects of the present invention.

Additional objects, embodiments, and details of the invention are set forth in the following detailed description of the invention.

BRIEF DESCRIPTION OF THE DRAWING

The drawing is a simplified process flow diagram in which:

The FIGURE shows a process for adsorbing hydrogen chloride (HCl) from a regeneration vent gas.

DETAILED DESCRIPTION OF THE INVENTION

In the conventional adsorption processes described above, the adsorption zone requires additional catalyst to inventory the adsorption zone and an additional preheating zone. Further, using the spent catalyst as the sorbent couples the sorbent circulation rate to the catalyst circulation rate. Thus, any issue requiring stoppage of the sorbent for the adsorption process also requires the stoppage of the catalyst flow in the hydrocarbon conversion reaction zone and the regeneration zone, which can impact their availability.

Additionally, with a conventional retrofitted adsorption zone, regeneration gas flows upward in catalyst transfer pipes (CTPs) between the burn zone and the adsorption zone in the disengaging hopper. This regeneration gas contains water due to regeneration reactions. To prevent condensation in the CTPs, the CTPs must be heat traced and insulated. The CTPs are removed and tracing disconnected periodically to perform maintenance on the regeneration zone. The pipes must also be handled carefully to avoid damaging the tracing and insulation.

Referring now to the drawings, FIG. 1 shows an example process for adsorbing HCl from a regeneration vent gas 10. The regeneration vent gas 10 is purged from a burn zone 12 of a catalyst regeneration zone 14. In an example process, the catalyst regeneration zone 14 is disposed within a vessel, which includes the burn zone 12, a chlorination zone 16, a catalyst drying zone 18, and a catalyst cooling zone 20. Spent catalyst from a hydrocarbon conversion reaction process is delivered to the burn zone 12 via a catalyst inlet 22. The catalyst inlet 22 may be coupled to a spent catalyst outlet (not shown) of a hydrocarbon process reaction zone (not shown) for performing the hydrocarbon conversion process. The catalyst regeneration zone 14 preferably includes a regeneration zone disengaging hopper (not shown) coupled to or integrated with the catalyst inlet 22 for delivering spent catalyst to the burn zone 12. Examples of hydrocarbon conversion processes in the hydrocarbon process reaction zone include isomerization, dehydrogenation, reforming, alkylation, transalkylation, and others. Operations of such processes will be understood by those of ordinary skill in the art.

For example, a catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chloride. Alumina is a commonly used carrier. The preferred alumina materials are known as the gamma, eta and theta alumina with gamma and eta alumina giving the best results.

A significant property related to the performance of the catalyst is the surface area of the carrier. Catalyst particles are usually spheroidal, having a diameter of from about 1/16th to about 1/8th inch (1.5-3.1 mm), though they may be as large as 1/4th inch (6.35 mm).

During the course of a reforming reaction or other hydrocarbon process reactions, catalyst particles become deactivated as a result of mechanisms such as the deposition of coke on the particles; that is, after a period of time in use, the ability of catalyst particles to promote reforming reactions decreases to the point that the catalyst is no longer useful. The spent catalyst must be regenerated before it can be reused in a reforming process.

In the catalyst regeneration zone 14, the spent catalyst passes through the burn zone 12, in which carbonaceous material (coke) is burned off from the spent catalyst at a regenerating temperature, e.g., at a temperature of between 477 C-510 C (890 F-1100 F), to provide a regenerated catalyst. The regenerated catalyst passes, e.g., by gravity, to the chlorination zone 16, in which a chloride is replaced on the catalyst. A metal may also be dispersed on the catalyst in the chlorination zone 16. A chloro-species input line 22 can be provided for delivering a chloro-species to the chlorination zone 16 for replacing the chloride on the catalyst. Non-limiting example chloro-species include compounds such as Perchloroethene (perc) (Tetrachloroethylene); Trichloroethylene (1,1,2 Trichloroethylene); Trichloroethane (TCE) (1,1,1 Trichloroethane); Trichloroethane (1,1,2 Trichloroethane); Ethylidine dichloride (1,1 Dichloroethane); Ethylene dichloride (EDC) (1,2 Dichloroethane); Propylene dichloride (PDC) (1,1 Dichloropropane); Propylene dichloride (1,2 Dichloropropane); Trimethylene chloride (1,3 Dichloropropane); and Acetone dichloride (2,2 Dichloropropane).

The catalyst then passes, e.g., by gravity, to the drying zone 18, where the catalyst is dried at drying temperatures to remove water from the catalyst that accumulates during the burn. The dried catalyst then passes, e.g., by gravity, to the cooling zone 20, where the dried catalyst is cooled before exiting via a catalyst outlet 33. The catalyst outlet 33 can be coupled, for instance, to the hydrocarbon process reaction zone (not shown) for delivering the regenerated catalyst.

A process gas inlet 24 provides a process gas, e.g., air which is dried at a drier 26, and delivered to the cooling zone 20 via a process gas input line 28. A cooling zone vent gas line 30 outputs cooling zone vent gas, which can be heated by a heater 32 and delivered to the drying zone 18 at the drying temperature.

Circulating burn zone gas exits from the burn zone 12 via a burn zone circulating gas line 36. A portion can be returned to the burn zone 12 via a return line 40. The returned burn zone gas can be temperature adjusted, e.g., cooled via a cooler 42 or heated via a heater 44, and the temperature adjusted burn zone gas can be delivered to the burn zone 12 via a temperature adjusted burn zone gas line 46. An oxygen analyzer 48 can be provided in the temperature adjusted burn zone gas line 46 to monitor an oxygen level in the returned burn zone gas.

To adsorb HCl from the regeneration vent gas 10, the regeneration vent gas is cooled, e.g., in a cooler 50, from a temperature of between about 482 C to 593 C (900 F to 1100 F) to an adsorbing temperature between about 38 C to 260 C (100 F to 500 F), and the cooled regeneration vent gas is passed via a cooled regeneration vent gas line 52 to an adsorption zone 60 that is spaced apart from the catalyst regeneration zone 14. "Spaced apart" as used herein refers to the adsorption zone 60 being separated by the catalyst regeneration zone 14 by a distance. For example, in the process shown in the FIGURE, the catalyst regeneration zone 14 is disposed within a vessel, and the adsorption zone 60 is disposed within a standalone vessel 62 that is separate from the vessel of the catalyst regeneration zone, though the vessels are coupled by one or more fluid conduits, such as the cooled regeneration vent gas line 52.

In an example embodiment, the adsorption zone 60 is part of a continuous moving bed system within the vessel 62, along with a sorbent regeneration zone 64 disposed below the adsorption zone. For example, the vessel 62 can include a stack of modules that are shop fabricated and assembled. Providing a separate vessel from assembled fabricated modules allows improved quality control, and avoids concerns with modifying existing equipment in the regeneration zone 14. The vessel 62 can be a single vessel, or can be one of two or more vessels to provide parallel or series adsorption for the regeneration vent gas 10.

The vessel 62 preferably further includes a sorbent loading zone 66 disposed above the adsorption zone 60, into which a sorbent is loaded via sorbent input line 68, and a sorbent collection zone 70 disposed below the sorbent regeneration zone 64. Additional zones (not shown) may be provided. A sorbent cooling zone, for example a heat exchanger 72, is disposed between the sorbent regeneration zone 64 and the sorbent collection zone 70. The sorbent loading zone 66, the adsorption zone 60, the sorbent regeneration zone 64, and the sorbent collection zone 70 can be, for instance, cylindrical zones, as shown in the FIGURE, in which sorbent flow through the vessel 62 is downflow, and gas flows are co-current or counter-current with respect to the sorbent flow (as indicated by arrows in the FIGURE). In other processes, sorbent flow is downflow through the vessel 62 and gas flow is radial or crossflow. Cylindrical and counter-current gas flow zones provide a more efficient driving force for mass transfer, while radial and cross flow zones provide lower level of pressure drop across the sorbent bed with lower sorbent volumes. In some embodiments, the modules are cylindrical vessels including cylindrical baffles for directing flow of gas between zones.

The adsorption zone 60 is preferably part of a moving bed system, in which sorbent flows through the vessel 62 downward between zones having different temperatures and is recycled to the top of the vessel. In the vessel 62 shown in FIG. 1, the sorbent passes, preferably by gravity, from the loading zone 66 to the adsorption zone 60, then to the sorbent regeneration zone 64, then to the sorbent cooling zone 72, and then to the sorbent collection zone 70 where collected sorbent is output via a sorbent output line 76 and passed to a sorbent return line 78. Via the sorbent return line 78, the sorbent is circulated to the sorbent input line 68 and delivered to the sorbent loading zone 68 to complete the cycle.

The sorbent loading zone 66 can be selectively supplied with sorbent via one or more devices to provide sorbent flow control. For example, one or more flow control hoppers (not shown) can be provided at the outlet of the sorbent collection zone 70, e.g., between valves, to selectively supply sorbent to the sorbent return line 78. Further, sorbent output line 76 can be sized to retain a volume of sorbent. Sorbent flow control can provide continuous flow of sorbent through the moving bed system. In an example process, sorbent flow control can alternatively or additionally include one or more thermal mass flow meters for thermal mass measurement. For example, by measuring temperatures around the sorbent cooling zone 72 to determine a temperature difference, and knowing the heat capacity of the sorbent, thermal mass measurement can be determined.

The sorbent preferably is lifted via the sorbent return line 78 using a carrier gas, for example nitrogen, to transport the sorbent, though other methods are possible. In the example process shown in FIG. 1, a lift gas (carrier gas) containing nitrogen, such as air, is supplied via a lift gas input line 80 with lift gas air blower 82. A heater 84 heats the input lift gas, e.g., to about 93 C to 149 C (200 F to 300 F). The heated input lift gas is provided to the sorbent return line 78 via a primary lift gas line 86, and to the sorbent output line 76 via a secondary lift gas line 88 into the vessel 62, e.g., the sorbent collection zone 72, to provide the carrier gas. Elutriation of the lift gas can take place at a combination lift line disengaging-elutriation device 89, and elutriation gas can be passed (e.g., recycled) from the elutriation device via an elutriation gas line (not shown) coupling the elutriation device to suction of the lift gas air blower 82. Elutriation gas inlet and outlet lines (not shown) can be provided as will be appreciated by those of ordinary skill in the art.

The circulating sorbent in the adsorption zone 60 preferably is decoupled from the catalyst that is regenerated in the catalyst regeneration zone 14 and that is circulated between the catalyst regeneration zone and other zones such as a hydrocarbon process reaction zone (not shown). By "decoupled," it is intended that the sorbent in the adsorption zone 60 be provided such that it can circulate independently of the circulation of the catalyst between the hydrocarbon process reaction zone and the catalyst regeneration zone 14. The sorbent can be of the same or different material with that of the catalyst used in the catalyst regeneration zone 14. Example sorbents include one or more of the catalysts above, as well as other sorbents such as gamma alumina or theta alumina.

The example process for adsorbing chloride shown in FIG. 1 is a vapor phase process. In the adsorption zone 60, the cooled regeneration vent gas 52 at the adsorbing temperature contacts the circulating sorbent. The sorbent is enriched with HCl from the cooled regeneration vent gas by being adsorbed to provide HCl-enriched sorbent. HCl-lean regeneration vent gas is also provided, and this HCl-lean regeneration vent gas is purged as an effluent gas, e.g., vented to atmosphere or routed to other processes, via regeneration vent gas output line 90.

The HCl-rich sorbent passes (e.g., by gravity) from the adsorption zone 60 to the sorbent regeneration zone 64. Circulating burn zone gas from the burn zone 12 is delivered to the sorbent regeneration zone 64 via sorbent regeneration gas input line 94, which is coupled to burn zone circulating gas line 36. This circulating burn zone gas has a desorbing temperature of between about 482 C to 593 C (900 F to 1100 F), which is sufficient to desorb the HCl from the sorbent. HCl-rich vent gas from the sorbent regeneration zone 64 is returned to the catalyst regeneration zone 14, e.g., via for example, a regeneration zone vent gas line 96 to the burn zone circulating gas line 36, alternately to the return line 40, or other suitable location in the catalyst regeneration zone. The HCl-rich regeneration zone vent gas from the sorbent regeneration zone 64 has a temperature of between 204 C to 482 C (400 F-900 F). HCl from the reintroduced HCl-rich vent gas is readsorbed onto the catalyst in the burn zone 12, in the chlorination zone 16, or both.

As described above, the sorbent in the vessel 62 circulates through the sorbent loading zone 66, adsorption zone 60, sorbent regeneration zone 64, sorbent cooling zone (heat exchanger 72), sorbent collection zone 70, and again to the sorbent loading zone. The rate of sorbent circulation is preferably independent of the circulation rate of the catalyst between the regeneration zone 14 and the hydrocarbon process reaction zone. In an example process, the circulated sorbent in the vessel 62 can also provide a heat sink to assist in cooling the regeneration vent gas from line 10.

In an example process, a portion of the lift gas, e.g., air, having a temperature of between about 93 C to 149 C (200 F to 300 F) enters the sorbent collection zone 70 via sorbent output line 76 and enters the sorbent loading zone 66 via sorbent input line 68. After exiting the sorbent regeneration zone 64 the sorbent passes through the heat exchanger 72 before entering the sorbent collection zone 70. The heat exchanger 72 provides an indirect method to cool the sorbent from the sorbent regeneration zone 64.

In the example process air is the coolant used in the heat exchanger 72. The heat exchanger 72, preferably integrated into the vessel 62, receives tempered air at a temperature of between about 93 C to 204 C (200 F to 400 F) via line 98. Heated air exits the heat exchanger via line 102.

In the process shown in the FIGURE, the burn zone 12 is in communication with the adsorption zone 60, and the regeneration zone 64 is in communication with the catalyst regeneration zone 14. By, for instance, orienting the flow of gas in catalyst transfer pipes (CTPs) between for example, a regeneration zone disengaging hopper (not shown) and burn zone 12, wet regeneration gas in the CTPs can be reduced or eliminated. The relative pressure of the catalyst inlet 22, e.g., at the regeneration zone disengaging hopper (not shown) integrated with the catalyst inlet can be made greater than that of the burn zone 12, and the relative pressure of the burn zone 12 can be made greater than that of the adsorption zone 60, which is greater than atmosphere (e.g., for a process operating at atmosphere). This pressure profile allows wet regeneration gas to be effectively sealed to prevent the regeneration gas from entering the disengaging hopper (not shown) and lift gas system. In the process shown in the FIGURE, the lift gas entering via sorbent output line 76 and sorbent input line 68 can provide a nitrogen purge of the sorbent collection zone 70 and the sorbent loading zone 66.

It should be appreciated and understood by those of ordinary skill in the art that various other components such as valves, pumps, filters, coolers, etc. were not shown in the drawing as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for adsorbing hydrogen chloride (HCl) from a regeneration vent gas, the process comprising:
    cooling the regeneration vent gas from a catalyst regeneration zone;
    passing the cooled regeneration vent gas to an adsorption zone that is spaced apart from the catalyst regeneration zone;
    adsorbing HCl from the regeneration vent gas onto a sorbent in the adsorption zone to enrich the sorbent with HCl to provide HCl-rich sorbent and deplete HCl from the regeneration vent gas to provide HCl-lean regeneration vent gas;
    purging the HCl-lean regeneration vent gas as an effluent gas;
    passing the HCl-rich sorbent from the adsorption zone to a sorbent regeneration zone;
    desorbing HCl from the HCl-rich sorbent in the sorbent regeneration zone to provide a regenerated sorbent;
    transferring the regenerated sorbent to the adsorption zone;
    cooling the regenerated sorbent in a cooling zone disposed below the sorbent regeneration zone;
    collecting the regenerated sorbent in a collecting zone disposed below the cooling zone,
    measuring a temperature change in the cooling zone; and
    measuring a thermal mass flow using said measured temperature change.

2. A process for adsorbing hydrogen chloride (HCl) from a regeneration vent gas vented from a catalyst regeneration zone, the process comprising:
    cooling the regeneration vent gas from a regeneration zone to an adsorbing temperature;
    passing the cooled regeneration vent gas to an adsorption zone within an adsorption vessel that is spaced apart from the regeneration zone;
    adsorbing HCl from the regeneration vent gas onto a sorbent in the adsorption zone at the adsorbing temperature to enrich the sorbent with HCl to provide an HCl-rich sorbent and deplete HCl from the regeneration vent gas to provide an HCl-lean regeneration vent gas;
    desorbing HCl from the HCl-rich sorbent in a sorbent regeneration zone disposed below the adsorption zone to provide a regenerated sorbent;
    introducing a lift gas to the adsorption vessel;
    passing a vent gas from the sorbent regeneration zone to the catalyst regeneration zone, wherein the vent gas includes a portion of the lift gas;
    purging the chloride-lean regeneration vent gas and another portion of the lift gas as an effluent gas; and
    circulating the regenerated sorbent to the adsorption zone.

3. The process of claim 2, wherein said circulating comprises transporting the sorbent using a carrier gas.

4. The process of claim 2, further comprising:
    passing a vent gas from a burn zone of the catalyst regeneration zone to the sorbent regeneration zone.

5. The process of claim 4, further comprising:
    returning a vent gas from the sorbent regeneration zone to the burn zone.

6. The process of claim 2, further comprising:
    controlling a flow of said circulating sorbent to the adsorption zone.

7. The process of claim 6, wherein said controlling comprises:
    collecting the regenerated sorbent in a collection zone disposed below the sorbent regeneration zone;
    controlling a flow of the regenerated sorbent from an output of the collection zone.

8. The process of claim 2, wherein a pressure of the burn zone is greater than a pressure of the sorbent regeneration zone.

9. The process of claim 2, further comprising:
    cooling the sorbent with a heat sink from the sorbent regeneration zone in a cooling zone.

10. The process of claim 2, wherein gas flow in the adsorption zone and the sorbent regeneration zone is co-current or counter-current with respect to the sorbent flow.

11. The process of claim 2, wherein gas flows radially in the adsorption zone and the sorbent regeneration zone.

12. A process for adsorbing hydrogen chloride (HCl) from a regeneration vent gas vented from a catalyst regeneration zone, the process comprising:
    cooling the regeneration vent gas from a burn zone in the regeneration zone to an adsorbing temperature;
    passing the cooled regeneration vent gas to an adsorption zone within an adsorption vessel that is spaced apart from the regeneration zone;
    introducing a lift gas to the adsorption vessel;
    adsorbing HCl from the regeneration vent gas onto a sorbent in the adsorption zone, said adsorbing enriching the sorbent with HCl to provide an HCl-rich sorbent and depleting HCl from the regeneration vent gas to provide an HCl-lean regeneration vent gas;
    passing the HCl-rich sorbent by gravity from the adsorption zone to a sorbent regeneration zone;
    passing a burn zone vent gas from the burn zone to the sorbent regeneration zone;
    desorbing HCl from the HCl-rich sorbent in the sorbent regeneration zone to provide a regenerated sorbent and a sorbent regeneration vent gas;
    cooling the regenerated sorbent in a cooling zone;
    passing the sorbent regeneration vent gas to the catalyst regeneration zone;
    collecting the cooled sorbent in a sorbent collection zone;
    purging the HCl-lean regeneration vent gas and a portion of the lift gas to atmosphere; and
    transferring the collected sorbent from the sorbent collection zone to the adsorption zone along with a portion of the lift gas;
    wherein the sorbent circulates between the adsorption zone, the sorbent regeneration zone, the cooling zone, and the collection zone independently of a circulation of the catalyst between the catalyst regeneration zone and a hydrocarbon process reaction zone.

\* \* \* \* \*